United States Patent [19]
Wang et al.

[11] Patent Number: 5,857,032
[45] Date of Patent: Jan. 5, 1999

[54] SYSTEM AND METHOD FOR MEASURING AND MONITORING THREE-DIMENSIONAL SHAPED OBJECTS

[75] Inventors: Weiping Wang, Schenectady; Michael Evans Graham, Slingerlands; John Knox Hinds, Glenville; Garth M. Nelson, Ballston Lake, all of N.Y.

[73] Assignee: General Electric Company, Schenectady, N.Y.

[21] Appl. No.: 837,884

[22] Filed: Apr. 25, 1997

[51] Int. Cl.[6] .............................. G06K 9/46; G06K 9/66; G09G 5/00
[52] U.S. Cl. .......................... 382/154; 382/193; 345/425
[58] Field of Search ..................... 382/130, 154, 382/193, 276; 345/425; 395/125; 356/376, 377

[56] References Cited

U.S. PATENT DOCUMENTS 5,531,520  7/1996  Grimson et al. ........................ 382/131
5,687,305  11/1997  Graham et al. ......................... 345/425

OTHER PUBLICATIONS

"Optical Methods" by CA Walker, et al, Non–Destructive Testing of Fiber–reinforced Plastic Composites, by J. Summercodes, vol. 1, 1987, pp. 112–117.

"Encoded Moire Inspection Based on a Computer Solid Model" by J. Nurre, et al, IEEE Trans on Pattern Analysis and Machine Intelligence, vol. 14, No. 12, Dec. 1992, pp. 1214–1218.

"Computer Generated Moire Interferometry" by K. Ryan, et al, IEEE 1992, pp. 1193–1199.

*Primary Examiner*—Andrew W. Johns
*Assistant Examiner*—Monica S. Davis
*Attorney, Agent, or Firm*—David C. Goldman; Marvin Snyder

[57] ABSTRACT

This invention discloses a system and method for measuring and monitoring three-dimensional shaped objects with projections of computer models of the objects. The computer models of the three-dimensional shaped objects are in the form of grid patterns. An image of the computer model of grid patterns is simultaneously projected from a dual projection system in two directions onto a real world instance of the object. Any variation between the computer model and the real world instance of the object is highlighted directly on the object by interference patterns of the two projections on the real world instance. The variation is quantified by counting the number of interference patterns on the real world instance of the object.

15 Claims, 5 Drawing Sheets

SYSTEM AND METHOD FOR MEASURING AND MONITORING THREE-DIMENSIONAL SHAPED OBJECTS

FIELD OF THE INVENTION

The present invention relates generally to measuring and monitoring three-dimensional shaped objects and more particularly to measuring and monitoring three-dimensional shaped objects with projections of computer models of the objects.

BACKGROUND OF THE INVENTION

Gages and dial indicators are traditional tools that have been used for measuring simple shaped objects. However, the gages and dial indicators are not very useful for measuring complex three-dimensional shaped objects. Custom made templates are one type of tool that have been used for measuring complex three-dimensional shaped objects. The custom made templates measure complex three-dimensional shaped objects by checking the crosssectional profiles of the objects. A problem with using the custom made templates to measure complex three-dimensional shaped objects is that the templates can be expensive and require a great deal of skill to measure the objects and interpret the results. Computer controlled coordinate measuring machines (CCMs) are another type of tool that have been used to measure complex three-dimensional shaped objects. The CCM measures complex three-dimensional shaped objects by measuring the dimensions of the objects. In particular, the CCM is programmed to probe the objects and record coordinates by using a mechanical probe or a laser distance detector. Typically, the CCM requires lengthy programming, probing cycles, and setup. These limitations make it prohibitive to use the CCM for measuring and monitoring in-process parts that are mounted on machining, forming, or other process equipment. Any time spent on unloading in-process parts from the process, setting up the CCM for measuring the parts, and reloading the parts back in the process will be an unwieldy interruption of manufacturing work flow. Projection moirésystems are one type of tool that have been used to measure and monitor in-process parts. In these systems, grid images of the in-process parts are recorded on film and differences between the part and the image appear on the film as a series of moiréfringes. However, a problem with using projection moirésystems for measuring and monitoring in-process parts is that these systems cannot be used to directly visualize the differences on the film with a real world instance of the in-process part. Therefore, there is a need for a better tool for directly measuring and monitoring three-dimensional shaped objects, especially in manufacturing processes where it is impractical to use traditional contact measuring tools or projection moirésystems.

SUMMARY OF THE INVENTION

This invention has overcome the limitations associated with the traditional contact measuring tools and projection moirésystems by using projections of computer models of the three-dimensional shaped objects. Computer models are typically generated in mathematical form by using computer aided design (CAD) data or other digitized forms like three-dimensional computed tomography (CT) image data taken from x-ray or magnetic resonance imaging (MRI) devices. In this invention the computer models of the three-dimensional shaped objects are in the form of a plurality of grid patterns. An image of the computer model of grid patterns is simultaneously projected from two directions by two projectors onto a real world instance of the object. Any variation between the computer model and the real world instance of the object is highlighted directly on the object by interference patterns of the two projections of the images of the computer model of grid patterns. The variation is quantified by counting the number of interference patterns on the real world instance of the object. This invention is particularly suited for manufacturing processes such as machining operations and composite lay-up operations, where variations can be quickly detected and corrected without interrupting the work flow. This invention is also well suited for surgical procedures, where images of internal organs can be projected directly onto the site of surgery and used as an aid to the doctor performing the surgery.

Thus, in accordance with the present invention, there is provided a method and system for monitoring a three-dimensional shaped object. In this invention, a model of the three-dimensional shaped object is generated by a computer. The model of the three-dimensional shaped object has a plurality of grid patterns. A first projector projects an image of the computer generated model of grid patterns. A second projector projects the image of the computer generated model of grid patterns. The first projector and the second projector have an overlapping projective space. A transforming means transforms the image of the computer generated model of grid patterns to the first projector and the second projector in real time. The transforming means transforms the image to the first projector and the second projector by locating individual data points on the computer generated model of grid patterns and mapping the data points to the first projector and the second projector, wherein the image of the computer generated model of grid patterns is projected from the first projector and the second projector onto a real world instance of the object. The image of the computer generated model of grid patterns projected from the first projector and the second projector is compared with the real world instance of the object. Any variation between the projected images of the computer generated model of grid patterns on the real world instance is then determined.

DETAILED DESCRIPTION OF THE INVENTION

Figure 1:
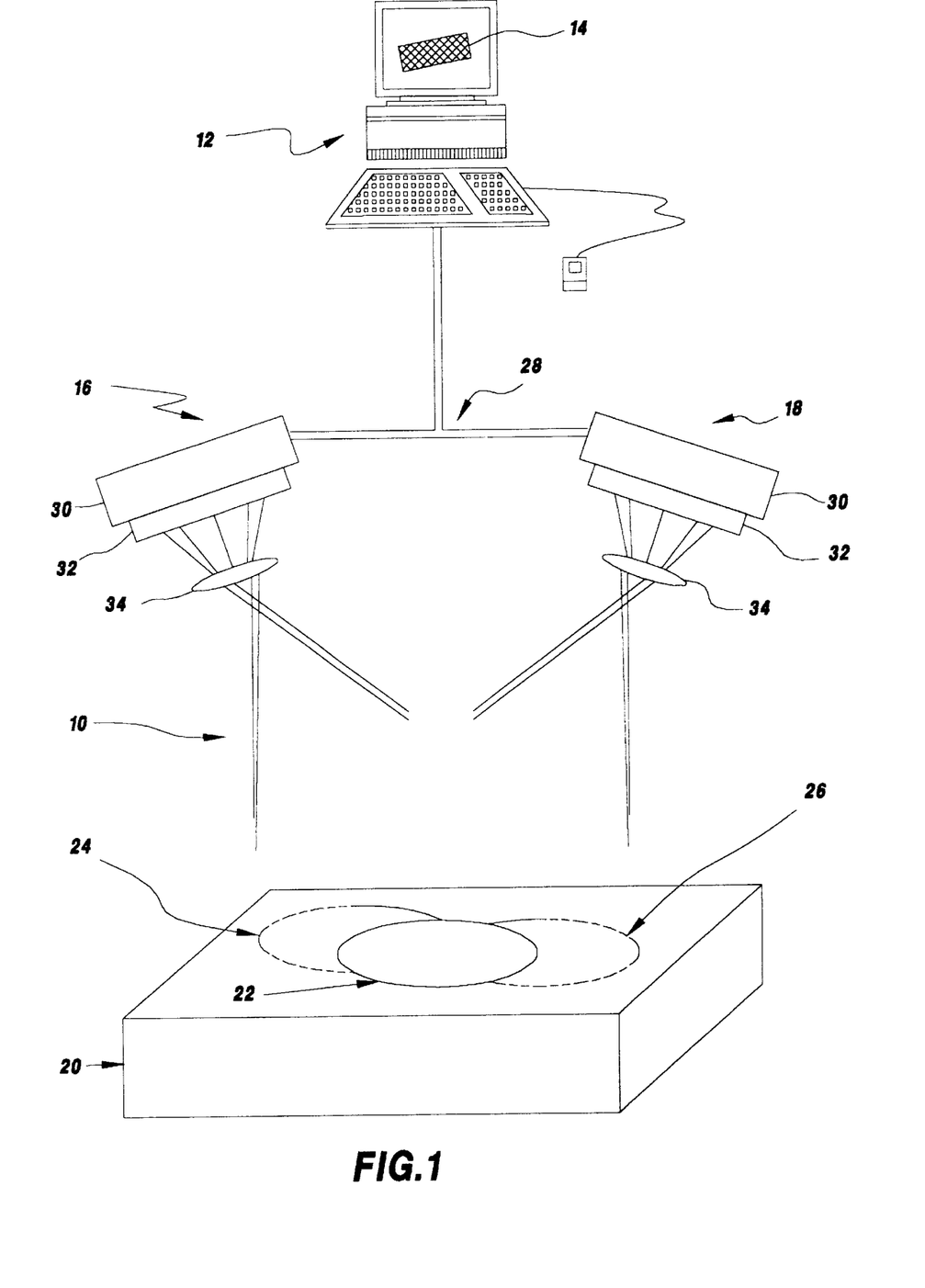
FIG. 1 is a system for measuring and monitoring three-dimensional shaped objects according to this invention.

FIG. 1 is a system 10 for measuring and monitoring three-dimensional shaped objects according to this invention. The system includes a computer 12 for generating a computer model 14 of a three-dimensional shaped object.

The model of the three-dimensional shaped object contains geometric information of the object and is in the form of a plurality of grid patterns. The model of grid patterns is based on commercial standard computer-aided-design (CAD) data such as IGES files. The grids are computerized by intersecting the surface of the model with a series of parallel planes. The computer transforms the model of grid patterns to a first projector 16 and a second projector 18 having an overlapping projective space. An image of the computer model of grid patterns is simultaneously projected from the first projector 16 and the second projector 18 onto a real world instance 20 of the three-dimensional shaped object. If the geometry of a feature 22 (i.e., surfaces, edges, etc.) on the real world instance 20 is the same as the computer model, then the projections from the first projector 16 and the second projector 18 will be coincident with the feature. However, if the projections from the first projector 16 and the second projector 18 are not coincident with the feature 22, then the projections 24 and 26 from the first projector and the second projector, respectively, will interfere with each other and with the feature directly on the real world instance. Areas where the feature 22 is different from the computer model 14 appears as patterns of interference or contours. The difference between the computer model and the feature on the real world instance is quantified by counting the number of patterns of interference.

Both the first projector 16 and the second projector 18 are connected to the computer 12 through a network 28 and are set up to have an overlapping projective space on the real world instance 20. The first projector 16 and the second projector 18 each has a light source 30 for emitting a beam of light, a projection stage 32 for receiving the beam of light and transferring an image of the model of grid patterns from the computer 12 to the real world instance 20, and optical means 34 (i.e. a series of optical devices such as lenses and mirrors) for directing the image of the computer model of grid patterns to the feature 22 on the instance. Each projector may include a grid screen for projecting a model with grid patterns if the computer generated model does not have grids. In this invention, the projectors may be a computer controlled laser scanner or an optical device like an overhead projector. If a computer controlled laser scanner is used, then the projection stage 30 may be a light crystal diode (LCD) panel. If an overhead projector is used, then the projection stage may be a flat transparent slide. This invention is not limited to a computer controlled laser scanner and other computer controlled devices like a light emitting diode (LED) panel, a cathode ray tube (CRT), an opaque projector, or a photographic slide holder may be used. Furthermore, this invention is not limited to an overhead projector, and other optical devices like a slide projector may be used. Regardless of which optical device is used, a graphical hardcopy of the model of grid patterns is produced using a printer or plotter and used as a transparency.

Figure 2:
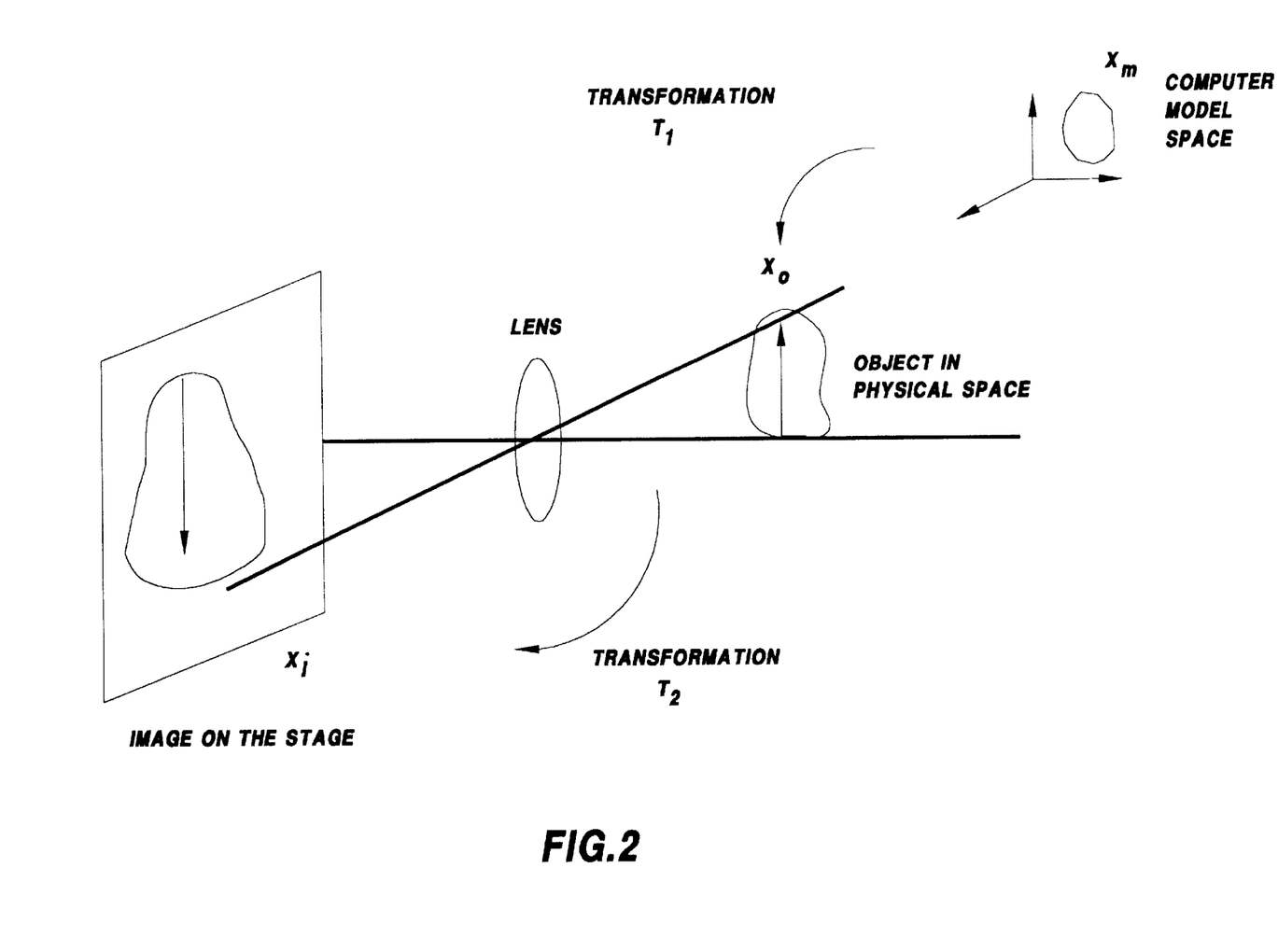
FIG. 2 is a schematic of a unified coordinate system used for performing projective transformations in this invention.

In this invention, the real world instance 20 does not require any special setup or position registering with the computer generated model of grid patterns 14. In particular, the computer generated model of grid patterns 14 and the real world instance are linked by a spatial transform formulated in real time by the computer 12. In this transform, individual data points located on the model of grid patterns are mapped to the first projector 16 and the second projector 18 so that the image of the model of grid patterns is projected from both projectors onto a feature of the real world instance 20. The spatial transformation uses a unified coordinate system as shown in FIG. 2. In the unified coordinate system, a transformation T is taken between a model space $X_m$, a real world instance space $X_o$, and an image space $X_i$ for each of the projection stages in the first projector and the second projector. The unified coordinate system uses Cartesian coordinates of a point (x,y,z) that are represented by (xw, yw, zw, w), wherein w is a scalar factor. The transformation T for each projection includes the transformation $T_1$ from the model space $X_m$ to the real world instance space $X_o$ and the transformation $T_2$ from the real world instance space $X_o$ to the image on the projection stage $X_i$. The transformation T rotates, scales, reflects, and shears the computer model of grid patterns to the real world instance in the real world instance space using the coordinates formulated for the transformation $T_1$ and the transformation $T_2$. The coordinates formulated for transformation $T_1$ and transformation $T_2$ are represented by equations 1–4 set forth below.

$$T_1 * X_m = X_o \qquad \text{Equation (1)}$$

and $$T_2 * X_o = X_i \qquad \text{Equation (2)}$$

wherein, $X_m$, $X_o$, and $X_i$ are vectors of dimension 4 and transformation $T_1$ and transformation $T_2$ are 4×4 matrices. Substituting equation (1) into equation (2) yields $$T_2 * T_1 * X_m = X_i \qquad \text{Equation (3)}$$

wherein $T_2 * T_1$ is a 4×4 matrix. Substituting T for $T_2 * T_1$, results in the transformation T from the model space to the image space, which is represented by another 4×4 matrix, defined as:

$$T * X_m = X_i \qquad \text{Equation (4)}$$

Figure 3:
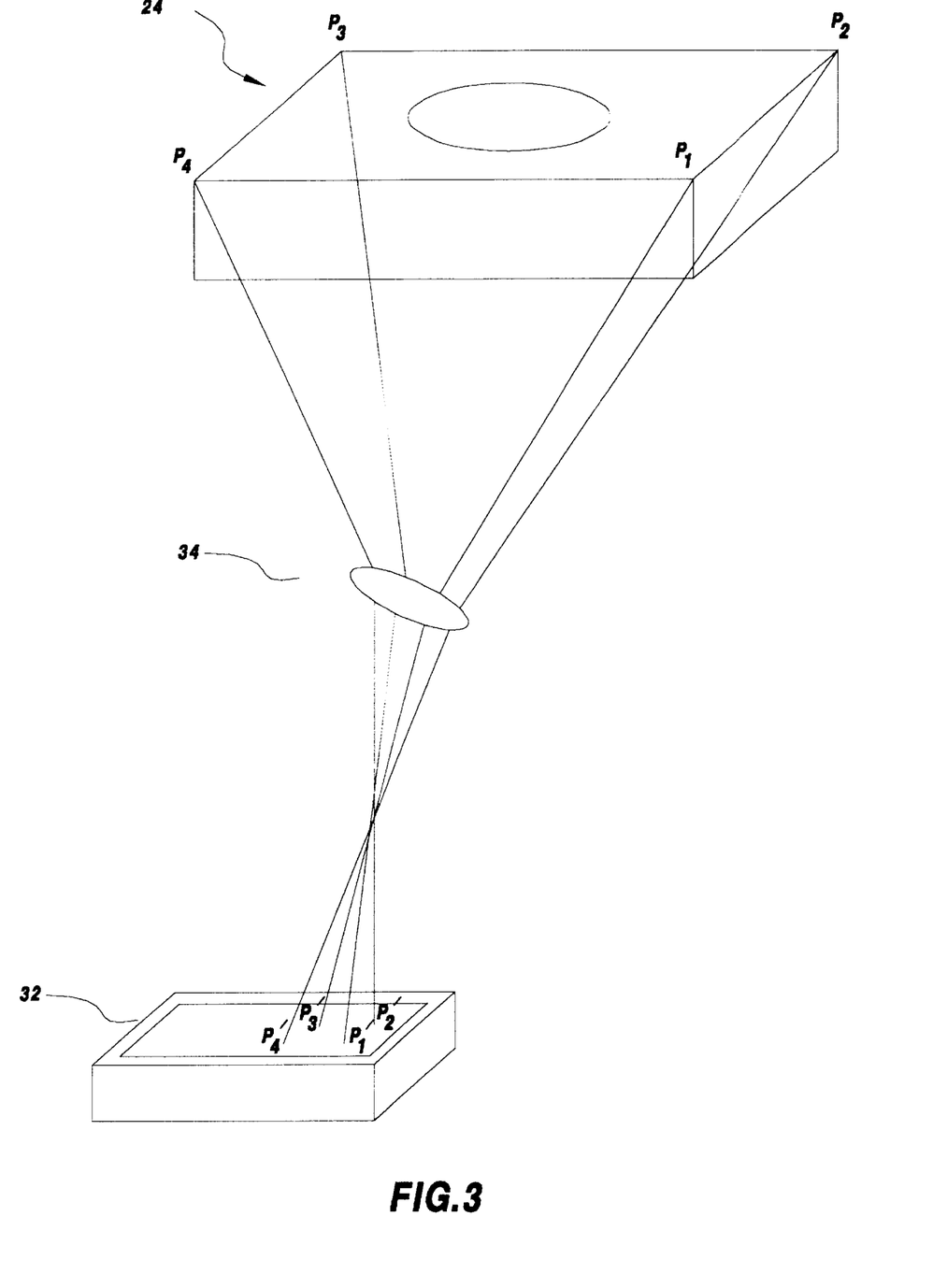
FIG. 3 is a schematic showing the alignment of a computer model of grid patterns to a real world instance for one projector in a dual projection system used in this invention.

In order to determine the transformation T, 16 unknown variables have to be determined. The unknown variables are solved by arbitrarily selecting four sets of points $P_1$, $P_2$, $P_3$, $P_4$ on the real world instance 20 and four corresponding sets of points in the model of grid patterns. The four points on the real world instance are traced back to their corresponding points $P'_1$, $P'_2$, $P'_3$, and $P'_4$ in the image of the model of grid patterns on each projection stage in both the first projector and the second projector, as shown in FIG. 3. Using equation (4) for the first set of points $P_1$ and $P'_1$, the following matrix is derived:

$$\begin{vmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{vmatrix} * \begin{vmatrix} w_1 & x_1 & w_1 & y_1 \\ & & & \\ w_1 & z_1 & w_1 & \end{vmatrix} = \begin{vmatrix} w_1' & x_1' & w_1' & y_1' \\ & & & \\ w_1' & z_1' & w_1' & \end{vmatrix}$$

Carrying out the matrix multiplication results in the following four equations:

$$a_{11}w_1x_1 + a_{12}w_1y_1 + a_{13}w_1z_1 + a_{14}w_1 = w_1'x_1'$$

$$a_{21}w_1x_1 + a_{22}w_1y_1 + a_{23}w_1z_1 + a_{24}w_1 = w_1'y_1'$$

$$a_{31}w_1x_1 + a_{32}w_1y_1 + a_{33}w_1z_1 + a_{34}w_1 = w_1'z_1'$$

$$a_{41}w_1x_1 + a_{42}w_1y_1 + a_{43}w_1z_1 + a_{44}w_1 = w_1'$$

Similarly, for $P_2$ and $P'_2$; $P_3$ and $P'_3$; and $P_4$ and $P'_4$; 12 additional equations are derived as follows:

$$a_{11}w_2x_2 + a_{12}w_2y_2 + a_{13}w_2z_2 + a_{14}w_2 = w_2'x_2'$$

$$a_{21}w_2x_230\ a_{22}w_2y_230\ a_{23}w_2z_230\ a_{24}w_2 = w_2'y_2'$$

$a_{31}w_2x_230\ a_{32}w_2y_2+a_{33}w_2z_2+a_{34}w_2=w_2'z_2'$ $a_{41}w_2x_2+a_{42}w_2y_2+a_{43}w_2z_2+a_{44}w_2=w_2'$ $a_{11}w_3x_3+a_{12}w_3\ y_3+a_{13}w_3z_3+a_{14}w_3=w_3'x_3'$ $a_{21}w_3x_3+a_{22}w_3\ y_3+a_{23}w_3z_3+a_{24}w_3=w_3'y_3'$ $a_{31}w_3x_3+a_{32}w_3\ y_3+a_{33}w_3z_3+a_{34}w_3=w_3'z_3'$ $a_{41}w_3x_3+a_{42}w_3\ y_3+a_{43}w_3z_3+a_{44}w_3=w_3'$ $a_{11}w_4x_4+a_{12}w_4\ y_4+a_{13}w_4z_4+a_{14}w_4=w_4'x_4'$ $a_{21}w_4x_4+a_{22}w_4\ y_4+a_{23}w_4z_4+a_{24}w_4=w_4'y_4'$ $a_{31}w_4x_4+a_{32}w_4\ y_4+a_{33}w_4z_4+a_{34}w_4=w_4'z_4'$ $a_{41}w_4x_4+a_{42}w_4\ y_4+a_{43}w_4z_4+a_{44}w_4=w_4'$

The 16 unknowns $a_{11}$, $a_{12}$, ..., $a_{44}$ from the above linear equations are used to determine the transformation T. These 16 equations represent four sets of four equations with four unknowns. The four sets are solved independently as simultaneous linear equations. Once the transformation matrix T is obtained, any points in the computer model of grid patterns can be transformed to their image location on the projection stages of both the first projector 16 and the second projector 18. More specifically, by using the computer 12, each point in the computer model of grid patterns is multiplied by the transformation T, transforming an image of the model to the real world instance in real time. The transformation matrix eliminates the time consuming steps of precisely aligning and setting up the location of individual model features or other geometric image characteristics that are located in the model of grid patterns as is necessary for conventional systems.

The system 10 is set up by placing the real world instance 20 within the operating range of the dual projectors. If necessary the optical means 34 in both the first projector 16 and the second projector 18 are adjusted so that the real world instance is positioned within the depth of field of the projection from the dual projectors. In particular, four points ($P_1$, $P_2$, $P_3$, $P_4$) on the real world instance are selected and marked for easy identification. Using optical reciprocity, the plurality of points are traced back through the optical means to locate their respective image ($P'_1$, $P'_2$, $P'_3$, $P'_4$) on the projection stage of both the first projector 16 and the second projector 18 and used to derive the transformation matrix T. These points are not necessarily fixed and more points although not necessary, can be used to determine the transformation matrix T. If a selected point is hidden due to the motion of the real world instance, then a new point may be substituted so that it is observable by the optical means in both the first projector 16 and the second projector 18. After tracing back the points and determining the transformation matrix T, the computer model of grid patterns is able to be transformed to the first projector 16 and the second projector 18, which both project the three-dimensional image of the model of grid patterns onto the real world instance 20.

Figure 4:
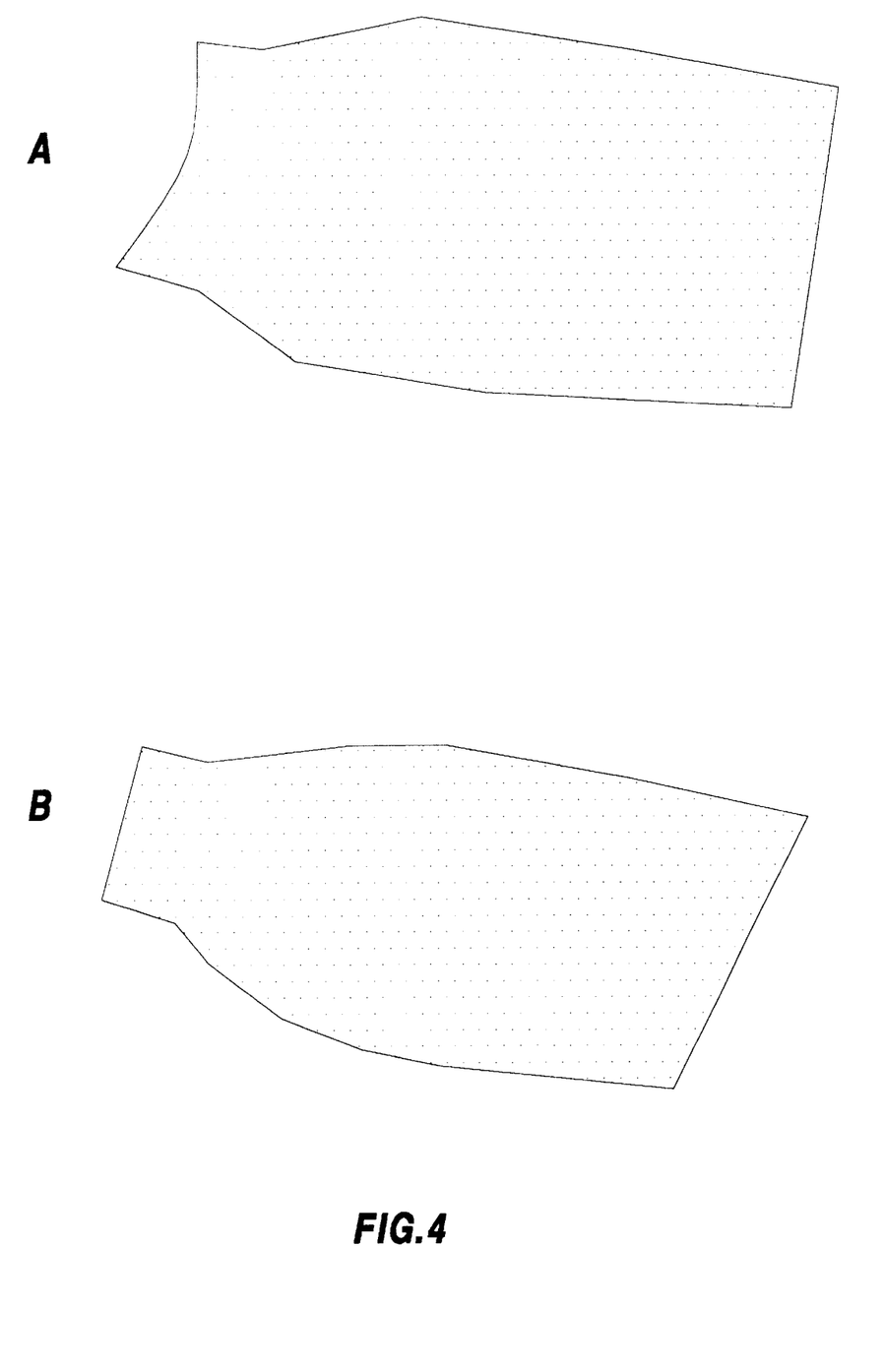
FIG. 4 is a projection of a computer model of grid patterns from a first projector and a second projector in the dual projection system of this invention.

If the geometry of the real world instance 20 is the same as that of the computer model of grid patterns, then the two images projected from the first projector 16 and the second projector 18 will be superimposed exactly on the instance. Otherwise, if the real world instance and the model of grid patterns are different, then the image projected from both the first projector 16 and the second projector 18 will interfere with each other. The interference between the projection of the model of grid patterns from the first projector 16 and the second projector 18 highlights the difference between the computer model and the real world instance. FIG. 4 shows a projection of a computer model of grid patterns for a feature of a real world instance such as fan blade from both the first projector and the second projector. The projection is in the form of a series of curves generated by slicing the surface of the solid model with a set of parallel, equidistant planes on the real world instance. Projection A is the projection of the model of grid patterns from the first projector 16 and projection B is the projection of the model of grid patterns from the second projector 18. Although the projections A and B are based on the same model of grid patterns, the difference that is shown in FIG. 4 is due to the difference in the projecting angles of the first projector 16 and the second projector 18 on the feature 22 of the real world instance 20.

Figure 5:
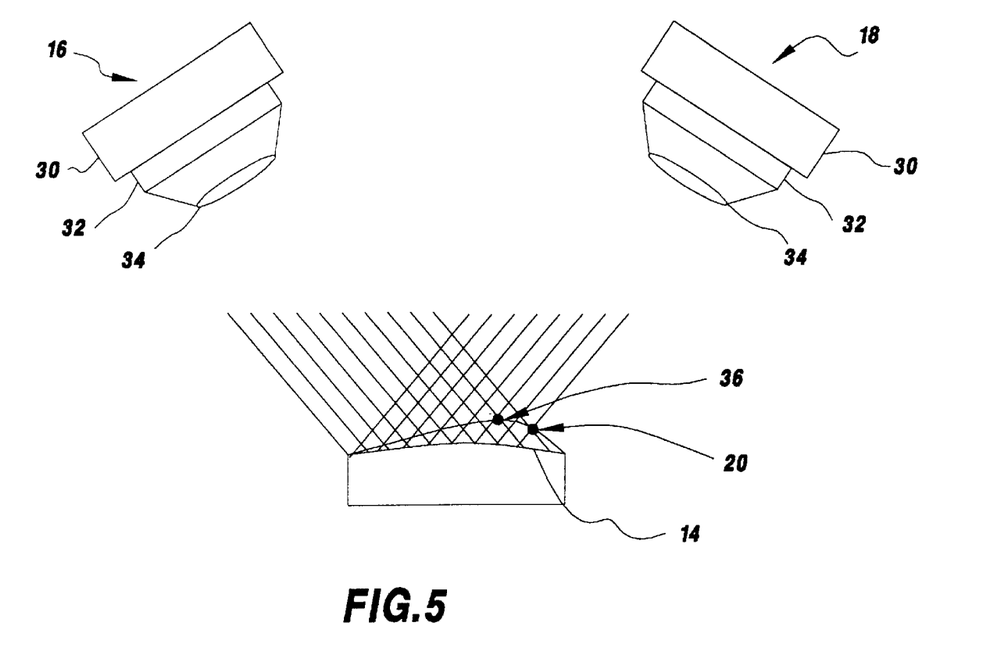
FIG. 5 shows the interference of light gratings projected from the first projector and the second projector on the surface of the real world instance.
Figure 6:
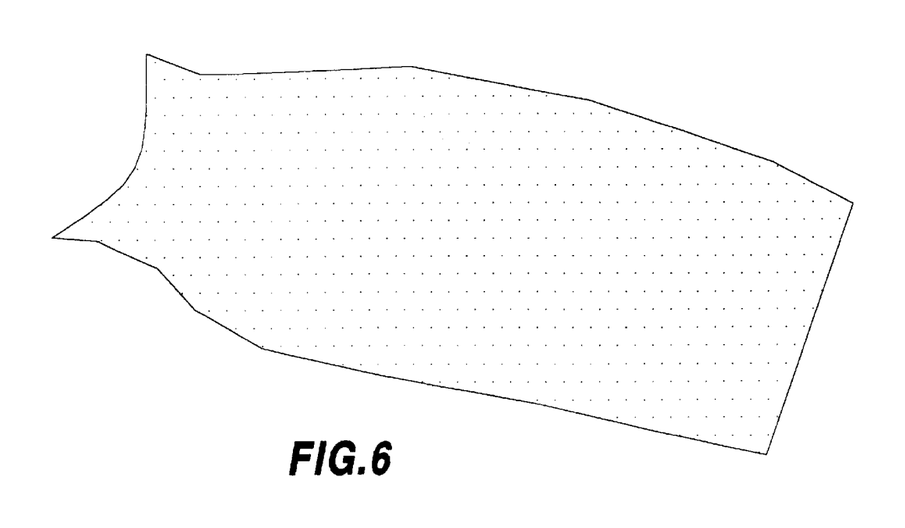
FIG. 6 is an example of a image projected from the first projector and second projector on the real world instance having contours.

FIG. 5 shows the light grids of the projections from the first projector 16 and the second projector 18 meeting at the surface of the real world instance 20. In this invention, the interference of the light grids of the projections from the first projector 16 and the second projector 18 indicate how well the computer model of grid patterns matches the surface of the real world instance. The areas where the computer model of grid patterns 14 are different than the surface of the real world instance are shown in FIG. 5 as periodic constructive interference patterns 36. The periodic constructive patterns of interference appear on the surface of the real world instance in the form of contours. The contours are a result of the combination of light gratings projected from the first projector 16 and the second projector on the surface of the real world instance 18. FIG. 6 shows an example of an image projected on the real world instance having contours. In FIG. 6, the feature of the real world instance is the same as the computer model of grid patterns except at the center of the feature where there are several contour patterns.

The variation between the model of grid patterns and the real world instance is based on the distance of the real world instance to the computer model of grid patterns. If the projection of the computer model of grid patterns is in the form of a series of curves generated by intersecting the model with a set of parallel, equidistant planes, then the distance between the model and the real world instance can be determined by setting the direction of one of the projectors parallel to the intersection planes. The distance between the computer model of grid patterns and a contour on the surface of the real world instance is determined as follows:

$$\delta = \frac{n\lambda}{\tan \alpha}, \text{ wherein} \qquad \text{Equation (5)}$$

$\delta$ is the distance from a point on a contour on the surface of the real world instance, $\alpha$ is the angle between the first projector and the second projector, $\lambda$ is the distance between two parallel planes, and n is the integer number of contours (i.e., 1, 2, 3, ... ). In general, the system 10 can be set up such that the angle between the first projector and the second projector, $\alpha$, is assumed to be constant. Therefore, the variation between the model of grid patterns and the real world instance is quantified by counting the number of interference patterns or contours on the surface of the real world instance. The resolution of the system can be adjusted by changing the distance of the parallel plane, $\lambda$, or by adjusting the angle between the first projector and the second projector, $\alpha$.

If the feature of the real world instance is different than the computer model of grid patterns, then the instance can be modified until the model is equal to the instance or within an acceptable limit. In this invention, the real world instance is modified until the interference patterns between the image projected from the first projector 16 and the second projector 18 have been removed from the surface of the instance. For example, in a machining manufacturing process, the observed variation may be entered into a computer controlled machine which compensates the production variation. It is also possible to correct the machining variation manually until the number of contours projected on the real world instance is within an acceptable limit. For assembly operations such as composite lay-ups where several hundreds of plies are manually placed on a tooling machine, operator variation or material variation can be quickly modified with this invention, without have to rely on the aforementioned conventional CMM techniques. This invention is also suited for various surgical procedures, and can be used to help doctors visualize humans "through-the-skin" as the image of internal organs is recreated and projected on a visible layer of skin or other tissue. As a result, surgical or other intervening procedures can be planned and performed more precisely and these plans maybe projected directly on the site of the surgery. In this example, spatial data generated from imaging sources such as a MRI or a CT, can be used directly instead of a computer generated model. The grid patterns can be formed by the computer or by using projection screens.

It is therefore apparent that there has been provided in accordance with the present invention, a system and method for measuring and monitoring three-dimensional shaped objects with projections of computer models of the objects that fully satisfy the aims and advantages and objectives hereinbefore set forth. The invention has been described with reference to several embodiments. However, it will be appreciated that variations and modification can be effected by a person of ordinary skill in the art without departing from the scope of the invention.

We claim:

1. A system for monitoring a three-dimensional shaped object, comprising:
   a computer for generating a model of the three-dimensional shaped object having grid patterns;
   a first projector for projecting an image of the computer generated model of grid patterns;
   a second projector for projecting the image of the computer generated model of grid patterns, the first projector and the second projector having an overlapping projective space;
   means for transforming the image of the computer generated model of grid patterns to the first projector and the second projector in real time, wherein individual data points located on the computer generated model of grid patterns are mapped to the first projector and the second projector, wherein the image of the computer generated model of grid patterns is projected from the first projector and the second projector onto a real world instance of the object; and
   means for comparing the image of the computer generated model of grid patterns projected from the first projector and the second projector with the real world instance of the object, the comparing means determining any variation between the projected images of the computer generated model of grid patterns on the real world instance.

2. The system according to claim 1, wherein the transforming means formulates a coordinate transformation between the computer generated model of grid patterns and the real world instance of the object for the images projected by the first projector and the second projector, the transforming means formulating the coordinate transformation by arbitrarily selecting a plurality of data points from the computer generated model of grid patterns and a plurality of corresponding data points located on the real world instance of the object and relating the plurality of data points from the real world instance of the object to the corresponding plurality of data points located on the computer generated model of grid patterns.

3. The system according to claim 2, wherein the transforming means derives a transformation matrix from the coordinate transformation.

4. The system according to claim 3, wherein the transformation matrix rotates, scales, reflects, and shears the computer generated model of grid patterns to the real world instance of the object in physical space.

5. The system according to claim 1, wherein the first projector and the second projector each comprise a light source for emitting a beam of light; a projection stage for receiving the beam of light and the image of the computer generated model of grid patterns; and optical means for directing the image of the computer generated model of grid patterns to the real world instance of the object.

6. The system according to claim 1, wherein the comparing means determines any variation between the projected image of the computer generated model of grid patterns on the real world instance of the object by locating interference patterns between the image projected from the first projector on the real world instance of the object and the image projected from the second projector on the real world instance of the object.

7. The system according to claim 6, further comprising means for quantifying the variation between the projected image of the computer generated model of grid patterns on the real world instance of the object by determining the number of interference patterns on the real world instance of the object.

8. The system according to claim 7, further comprising means for modifying the real world instance of the object until interference patterns between the image projected from the first projector and the image projected from the second projector on the real world instance of the object have been removed.

9. A method for monitoring a three-dimensional shaped object, comprising the steps of:
   generating a model of the three-dimensional shaped object having grid patterns;
   providing a first projector;
   providing a second projector, the first projector and second projector having an overlapping projective space;
   transforming an image of the computer generated model of grid patterns to the first projector and the second projector in real time, wherein individual data points located on the computer generated model of grid patterns are mapped to the first projector and the second projector;
   projecting the image of the computer generated model of grid patterns from the first projector and the second projector onto a real world instance of the object;
   comparing the image of the computer generated model of grid patterns projected from the first projector and the second projector with the real world instance of the object; and
   determining any variation between the projected image of the computer generated model of grid patterns from the first projector and the second projector with the real world instance.

10. The method according to claim 9, wherein the step of transforming comprises formulating a coordinate transformation between the computer generated model of grid patterns and the real world instance of the object for the images projected by the first projector and the second projector, wherein formulating the coordinate transformation comprises arbitrarily selecting a plurality of data points from the computer generated model of grid patterns and a plurality of corresponding data points located on the real world instance of the object and relating the plurality of data points from the real world instance of the object to the corresponding plurality of data points located on the computer generated model of grid patterns.

11. The method according to claim 10, further comprising deriving a transformation matrix from the coordinate transformation.

12. The method according to claim 11, wherein the transformation matrix rotates, scales, reflects, and shears the computer generated model of grid patterns to the real world instance of the object in physical space.

13. The method according to claim 9, wherein the step of comparing comprises determining any variation between the projected image of the computer generated model of grid patterns on the real world instance of the object by locating interference patterns between the image projected from the first projector on the real world instance of the object and the image projected from the second projector on the real world instance of the object.

14. The method according to claim 13, further comprising quantifying the variation between the projected image of the computer generated model of grid patterns on the real world instance of the object by determining the number of interference patterns on the real world instance of the object.

15. The method according to claim 14, further comprising modifying the real world instance of the object until interference patterns between the image projected from the first projector and the image projected from the second projector on the real world instance of the object have been removed.

* * * * *